United States Patent
Haribhatt et al.

(10) Patent No.: US 12,265,624 B2
(45) Date of Patent: Apr. 1, 2025

(54) CODE PATCHING FOR SYSTEM ON A CHIP

(71) Applicant: Analog Devices International Unlimited Company, Limerick (IE)

(72) Inventors: Akshayakumar Haribhatt, Gulbarga (IN); Venkatavishnu Ganesh Reddy Beeram, Andhra Pradesh (IN); Raka Singh, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 33 days.

(21) Appl. No.: 18/140,373

(22) Filed: Apr. 27, 2023

(65) Prior Publication Data
US 2023/0359740 A1    Nov. 9, 2023

(51) Int. Cl.
G06F 21/57    (2013.01)

(52) U.S. Cl.
CPC .................. *G06F 21/572* (2013.01)

(58) Field of Classification Search
CPC .............................. G06F 21/572; G06F 9/4401
See application file for complete search history.

(56) References Cited

U.S. PATENT DOCUMENTS

| | | | |
|---|---|---|---|
| 2015/0067313 A1* | 3/2015 | Zaidi | G06F 21/572 |
| | | | 713/2 |
| 2023/0236827 A1* | 7/2023 | Nemirovsky | G06F 8/71 |
| | | | 717/168 |
| 2024/0005004 A1* | 1/2024 | Abdulhamid | G06F 8/65 |

* cited by examiner

*Primary Examiner* — Stefan Stoynov
(74) *Attorney, Agent, or Firm* — Schwegman Lundberg & Woessner, P.A.

(57) ABSTRACT

Various examples are directed to a System on a Chip (SOC) and methods of operating the same. The SOC may access firmware code from a boot Read-Only Memory (ROM) of the SOC. The firmware code may comprise a plurality of functional blocks. The SOC may determine that firmware patching is active for the SOC and access patch data from a non-volatile memory of the SOC. The SOC may determine that a first functional block of the firmware code has been patched and access first patch code from the patch data. The first patch code may be associated with the first functional block. The SOC may execute the first patch code.

20 Claims, 6 Drawing Sheets

CODE PATCHING FOR SYSTEM ON A CHIP

CLAIM OF PRIORITY

This application claims priority to Indian Patent Application No. 202241026534 filed on May 7, 2022, which is hereby incorporated by reference in its entirety.

BACKGROUND

A System on a Chip (SOC) is an integrated circuit or chip that includes various components of the system including at least one processor, at least one memory, and at least one input/output (I/O) interface. SOC's have gained favor over designs using higher numbers of chips for various reasons including the possibility of smaller-sized designs and the possibility of lower power usage.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION

Figure 1:
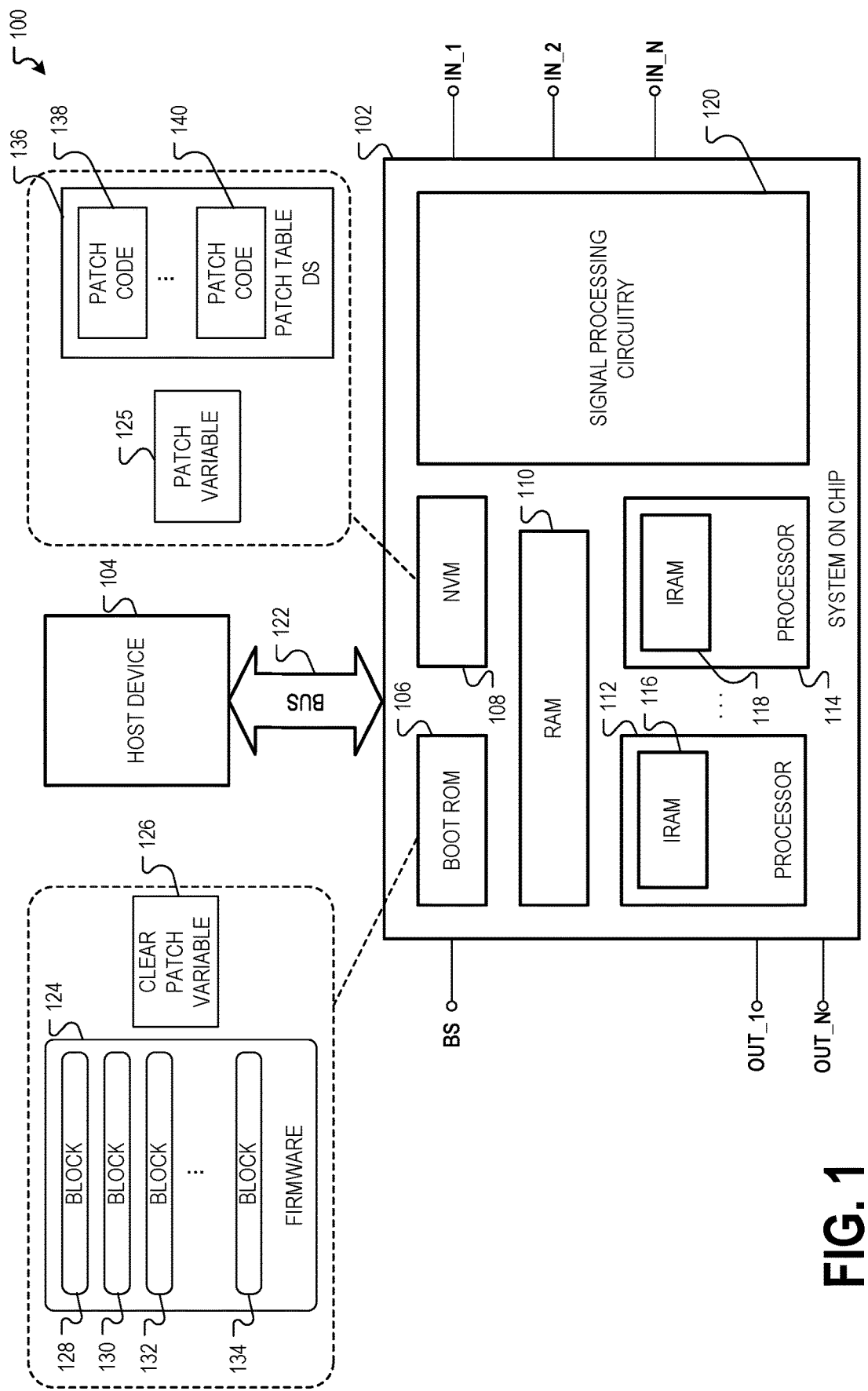
FIG. 1 is a diagram showing one example of an environment comprising a System on a Chip (SOC) configured to support code patching.

A System on a Chip (SOC) can be configured to execute firmware code upon start up. When executed by a processor at the SOC, the firmware code causes the processor to initialize various components at the SOC to prepare the SOC for operation. For example, firmware code may include instructions for initializing various hardware components on the SOC such as various memory devices, various clocks, various processors, various I/O interfaces, and/or the like. The firmware code may also include instructions for performing other initializations, such as for example, launching an operating system (OS) that may handle operation of the SOC after the firmware code is executed.

Firmware code may be stored at the SOC in a non-volatile read-only memory (ROM). The ROM storing firmware code is sometimes referred to as a boot ROM. When the SOC is started up, one or more processors of the SOC may be configured to access the firmware code from the boot ROM and execute the firmware code to initialize the SOC and prepare it for operation.

In many SOCs, the firmware code for an SOC is burned into the boot ROM. As a result, it may not be possible to modify the firmware code after the boot ROM has been burned without performing a complete re-tapeout of the SOC. This can make it very complicated and costly to modify firmware code. The difficulty of modifying firmware code can create challenges for the designers and developers of SOCs. For example, practical limits on the ability to change the firmware code can limit the ability of developers and designers to correct bugs in the firmware code, add functionality to the firmware code, or otherwise modify the firmware code after the initial tapeout of the SOC.

In some examples, the SOC may be arranged to patch firmware code stored at the boot ROM. For example, the SOC may maintain a function table with entries corresponding to different functions called by the firmware code. When the SOC (e.g., a processor thereof) executes the firmware code, it may be configured to consult the function table each time the firmware code includes a call to a function. If the function table does not indicate any patch to the called function, the SOC will execute code for the function from the firmware code. If the function table does indicate a patch to the called function, then the SOC will execute a version of the function stored at and/or referenced by the function table. This example arrangement, however, may also have several disadvantages. For example, the function table may include a record for every function from the firmware code that is capable of being patched. In some examples, any functions from the firmware code that do not have a corresponding record at the function table may not be patchable. Accordingly, as the portion of the firmware code that is capable of being patched increases, the size and complexity of the function table may also increase.

Using a function table may also lessen the readability of the firmware code. For example, it may be desirable for a developer or other human user to read firmware code, including any patches thereto, for various purposes such as debugging, version upgrades, and/or the like. When a function table is used, a user wanting to trace the execution of the firmware code may need to consult the firmware code itself and then also consult the function table for each function called in the firmware code.

These and other challenges may be addressed utilizing an SOC with firmware code organized to include a plurality of functional blocks. A functional block of the firmware code may include instructions that direct a processor of the SOC to perform a discrete task at the SOC. Examples of discrete tasks that may be performed by functional blocks of the firmware code include, for example, initializing a clock or clocks for the SOC, initiating an I/O interface or interfaces at the SOC, initializing one or more communication buses at the SOC, configuring one or more peripheral interfaces at the SOC, and/or the like. Discrete tasks that may be performed by respective functional blocks of the firmware code include, initializing input and output data formats, configuring and/or managing different subsystems of the SOC, performing various signal processing tasks on received data, and/or the like.

The SOC may also include a non-volatile memory. When it is desirable to patch the firmware code, a patch table data structure may be stored at the non-volatile memory. The patch table data structure, in some examples, includes a record for each functional block of the firmware code. When a functional block of the firmware code is to be patched, patch code for that functional block may be written to the corresponding record of the patch table data structure.

Upon startup of the SOC, one or more processors at the SOC may access the firmware code from the boot ROM and begin to execute it. The firmware code may arrange the processor such that, prior to entering each functional block of the firmware code, the processor consults the patch table data structure to determine if that functional block has been patched. If the functional block has been patched, the processor may execute patch code from the corresponding record of the patch table data structure. The patch code may execute in addition to or instead of the corresponding functional block of the firmware code. In this way, a developer may have flexibility to replace, supplement, and or modify the functional block relative to what is written at the boot ROM.

FIG. 1 is a diagram showing one example of an environment 100 comprising an SOC 102 configured to support code patching as described herein. In the example of FIG. 1, the SOC 102 is in communication with the host device 104 via a communication bus 122. The communication bus 122 may be arranged according to any suitable hardware and/or software protocol or protocols, such as, for example, the Inter-Integrated Circuit (I2C) protocol.

The SOC 102 may be configured to perform various different tasks, for example, depending on the implementation. In some examples, the SOC 102 is configured to interface with one or more sensors or other data generating devices. Such an example of the SOC 102 may be configured to perform various sensor management tasks such as, for example, providing bias to one or more sensors, sequencing one or more sensors, receiving data from the one or more sensors, processing data from the one or more sensors, and/or the like. The SOC 102 may provide data obtained from sensors to the host device 104 via the communication bus 122.

In some examples, the SOC 102 may be configured to control one or more hardware devices such as, for example, one or more motors, one or more solenoids, one or more switches, and/or the like. In some examples, the SOC 102 may receive instructions for controlling the one or more hardware devices from the host device 104 via the communication bus 122. Also, in some examples, the SOC 102 may control the one or more hardware devices based on data received by the SOC 102 from one or more sensors.

The SOC 102 comprises a processor 112. The processor 112 may be or include any suitable microcontroller, digital signal processor (DSP), or any other suitable processor. In some examples, the processor 112 comprises an internal random-access memory (IRAM) 116 which may be, for example, a cache or other suitable memory device. In the example of FIG. 1, the SOC 102 includes an additional processor 114 that includes additional internal IRAM 118. Although two processors 112, 114 are shown, it will be appreciated that an SOC, such as the SOC 102, may include more or fewer than two processors. In some examples, the processor 112 may be a microcontroller configured to control operations of the SOC 102 while the processor 114 may be a DSP configured for processing data received from one or more sensors or other data sources.

In the example of FIG. 1, the SOC 102 also includes signal processing circuitry 120. The signal processing circuitry 120 may include various circuit components for receiving and processing data from sensors or other data sources. The signal processing circuitry 120, for example, may include various analog-to-digital converters, digital-to-analog converters, buffer circuits for buffering signals provided to and/or received from sensors, amplifier circuits for generating bias signals to be provided to sensors, and/or the like.

Also, in the example of FIG. 1, the SOC 102 includes various example I/O pins. Input pins IN_1, IN_2, INN may receive inputs, for example, from sensors or other external components that are in communication with the SOC 102. Output pins OUT_1, OUT_N may be used by the SOC 102 to provide output signals to other components. In some examples, the communication bus 122 may utilize some or all of the input and or output pins of the SOC 102. The SOC 102 also includes a bootstrap pin BS. The bootstrap pin BS may be used in some examples to indicate that one or more of functional blocks 128, 130, 132, 134 of firmware code 124 have been patched. Although two output pins OUT_1, OUT_N and three input pins IN_1, IN_2, IN_N are shown in FIG. 1, it will be appreciated that a SOC 102 may include more or fewer pins than are shown in capital FIG. 1, including more or fewer input pins or more or fewer output pins. Additionally, some SOCs 102 may include pins that are used for both input and output such as, for example, one or more pins utilized by the communication bus 122.

The SOC 102 also includes various memories including a boot ROM 106, a non-volatile memory 108, and a RAM 110. The boot ROM 106 may be a read-only memory with data burned into the boot ROM 106 at the time of manufacture. The non-volatile memory 108 may be writable and may maintain stored data when the SOC 102 is powered down. In some examples, the non-volatile memory 108 is one-time programmable (OTP). Also, in some examples, the non-volatile memory 108 may be or include a peripheral data storage device, such as a device in communication with the SOC 102 via a Peripheral Component Interconnect (PCI), Serial Peripheral Interface (SPI) or other suitable interface. The RAM 110 may be writable and may not maintain stored data when the SOC 102 is powered down.

The boot ROM 106 may store firmware code 124 and may, optionally, include a clear patch variable 126. The firmware code 124 may be divided into a plurality of functional blocks 128, 130, 132, 134. Although four functional blocks 128, 130, 132, 134 are shown in FIG. 1, it will be appreciated that firmware code 124 may be divided into more or fewer than four functional blocks.

Each of the functional blocks 128, 130, 132, 134, when executed, may perform a discrete function or task at the SOC 102. For example, a first functional block 128 of the firmware code 124 may include code for initializing a phase-locked loop (PLL) and/or other aspects of one or more clocks at the SOC 102. A second functional block 130 of the firmware code 124 may include code for initializing a particular type of I/O interface such as, for example, a General Purpose Input Output (GIPO) pin or pins, an SPI, a PCI, or other suitable I/O interface. A third functional block 132 may include code for initializing all or part of the signal processing circuitry 120. The functional block 134 may include code for initializing the communication bus 122. It will be appreciated that the example functions of the functional blocks 128, 130, 132, 134 are examples and that in different implementations, the various functional blocks 128, 130, 132, 134 of the firmware code 124 may have different functionalities then what are described herein.

The non-volatile memory 108, in some examples, may include a patch table data structure 136. The patch table data structure 136 may include records for some or all of the functional blocks 128, 130, 132, 134 of the firmware code 124. If a functional block 128, 130, 132, 134 of the firmware code 124 has been patched, the patch table data structure 136 may include a patch variable 125 and patch code 138, 140 for the patch to functional block at its corresponding record at the patch table data structure 136. In some examples, the patch code 138, 140 is or includes compiled code in the form of one or more binaries that are executable by processor 112 and/or the processor 114.

When the SOC 102 is powered-up, the processor 112 may access the firmware code 124 from the boot ROM 106 and begin to execute it. In some examples, the processor 112 may load the firmware code 124 from the boot ROM 106 to the RAM 110 and/or to the IRAM 116 and execute the firmware code 124 from the RAM 110 and/or the IRAM 116 rather than executing it directly from the boot ROM 106.

When executing the firmware code 124, the processor 112 may determine whether firmware patching is active for the SOC 102. This may be performed in various different ways. In some examples, firmware patching may be activated by providing an appropriate signal at the bootstrap pin BS. For example, if it becomes desirable to patch the firmware code 124, the SOC 102 may be configured in a circuit that provides a signal at the bootstrap pin BS. In another example, the processor 112 may determine whether firmware patching is active for the SOC 102 by referring to a location at the non-volatile memory 108. For example, if it becomes desirable to patch the firmware code 124, the SOC 102 may be configured to include a data value indicating that patching is active at a predetermined location at the non-volatile memory 108.

If firmware patching is not active for the SOC 102, then the processor 112 may execute the firmware code 124 as accessed from the boot ROM 106. This may include, for example, executing the various functional blocks 128, 130, 132, 134 of the firmware code 124 in the order indicated by the firmware code 124.

If firmware patching is active for the SOC 102, the processor 112 may determine which functional blocks 128, 130, 132, 134 of the firmware code 124 have been patched. This may include, for example, referring to the patch table data structure 136. For example, functional blocks 128, 130, 132, 134 that have been patched may have patch code 138, 140 stored at the patch table data structure records corresponding to those functional blocks 128, 130, 132, 134. When the processor 112 enters a functional block 128, 130, 132, 134 that has been patched, the processor 112 may execute corresponding patch code 138, 140 from the patch table data structure 136. The patch code 138, 140 may be executed in addition to or instead of the corresponding functional block 128, 130, 132, 134.

Figure 2:
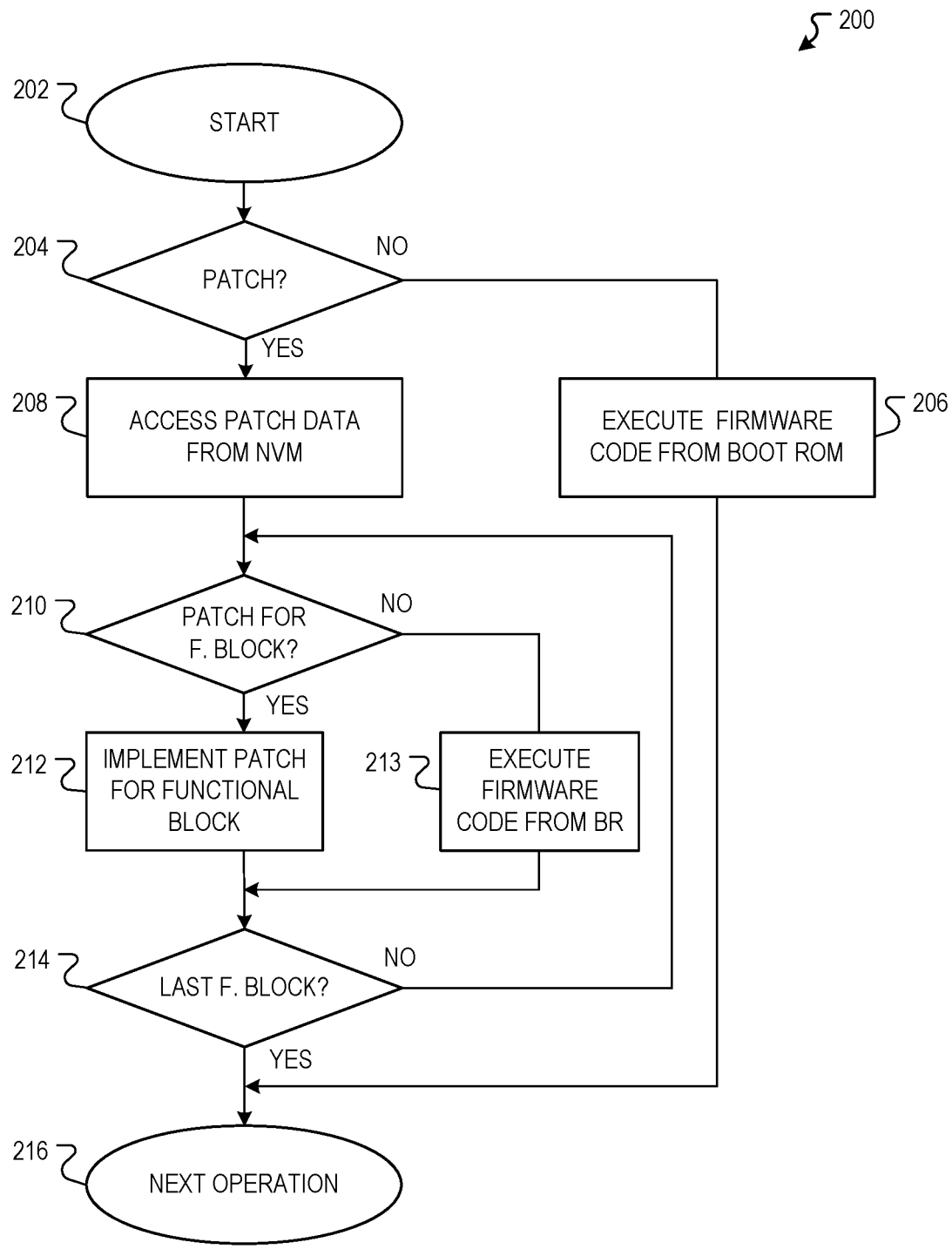
FIG. 2 is a flow chart showing one example of a process flow that may be executed by a processor of an SOC to execute firmware code.

FIG. 2 is a flow chart showing one example of a process flow 200 that may be executed by a processor of the SOC 102, such as the processor 112, to execute the firmware code 124. At operation 202, the processor 112 may begin to execute the firmware code 124. In some examples, the processor 112 may load the firmware code 124 from the boot ROM 106 to the RAM 110.

At operation 204, the processor 112 may determine whether firmware patching is active for the SOC 102. This may include, for example, determining whether the bootstrap pin BS is asserted. The bootstrap pin BS may be asserted, for example, by providing a predetermined electrical signal at the bootstrap pin BS. In some examples, the bootstrap pin BS is asserted by providing a low voltage at the bootstrap pin (e.g., zero volts or less than a threshold voltage. Also, in some examples, the bootstrap pin BS is asserted by providing a high voltage at the bootstrap pin BS (e.g., greater than 3 volts, greater than 5 volts, greater that 12 volts and/or the like).

If the bootstrap pin BS is asserted, the processor 112 may determine that firmware patching is active for the SOC 102. If the bootstrap pin BS is not asserted, the processor 112 may determine that firmware patching is not active for the SOC 102. The bootstrap pin BS may be asserted when a signal indicating firmware patching is present at the bootstrap pin BS. The signal indicating firmware patching may be any suitable signal and/or the absence of a signal. Also, in some examples, determining whether firmware patching is active for the SOC 102 may include accessing a predetermined location at the non-volatile memory 108. If firmware patching is active, the predetermined location at the non-volatile memory 108 may include a value indicating that firmware patching is active. If firmware patching is not active, the processor 112 may, at operation 206, execute the firmware code 124 as stored at the boot ROM 106 (e.g., without executing patch code).

If firmware patching is active, the processor 112 may, at operation 208, access patch data from the non-volatile memory 108. The patch data may include some or all of the patch table data structure 136, including patch code 138, 140. In some examples, the patch data may also include the patch variable 125. The processor 112 may utilize the data directly from the non-volatile memory 108 or may load some or all of the patch data to a RAM such as the RAM 110 and or the IRAM 116.

At operation 210, the processor 112 may determine whether a first functional block 128 of the firmware code 124 has been patched. For example, the processor 112 may refer to a record of the patch table data structure 136 corresponding to the functional block 128. If the record includes patch code, 138, 140, that may indicate that the functional block 128 has been patched. Also, in some examples, the processor 112 may refer to the patch variable 125. The patch variable may include a number of bits corresponding to the number of functional blocks 128, 130, 132, 134 in the firmware code 124. The value of the bit corresponding to the functional block 128 may indicate whether the functional block 128 has been patched.

In some examples, instructions causing the processor 112 to access patch variable 125 may be included in each functional block 128, 130, 132, 134. Accordingly, when the processor 112 begins to execute each functional block 128, 130, 132, 134, it may first consult a patch variable to determine whether that functional block has been patched. If firmware patching for the SOC 102 is inactive, this operation may refer to the clear patch variable 126 that is (initially) stored at the boot ROM 106. The clear patch variable 126 may not indicate that any of the functional blocks 128, 130, 132, 134 have been patched. If firmware patching for the SOC 102 is active, then this operation may refer to the patch variable 125, which may indicate which of the functional blocks 128, 130, 132, 134 have been patched.

If the processor 112 determines that the first functional block 128 has been patched, then the processor 112 may, at operation 212, implement the patch for the functional block 128. This may include executing patch code 138, 140 corresponding to the functional block 128. For example, the processor 112 may access the record at the patch table data structure 136 corresponding to the functional block 128, which may include patch code 138, 140 corresponding to the functional block 128. The processor 112 may execute the patch code 138, 140. In some examples, the processor 112 may also execute some or all of the functional block 128. For example, the processor 112 may initially execute the patch code 138, 140. In some examples, the patch code 138, 140 may include instructions to the processor 112 to execute some or all of the corresponding functional block 128 from the boot ROM 106. If the processor 112 determines, at operation 210, that the first functional block 128 has not been patched, then the processor may, at operation 213, execute firmware code for the first functional block 128 from the boot ROM 106.

After implementing the patch for the functional block 128 and/or after executing firmware code for the first functional block 128 from the boot ROM 106, the processor 112 may determine, at operation 214, whether the functional block 128 is the last functional block of the firmware code 124. If the functional block 128 is not the last functional block of the firmware code 124, the processor 112 may move to the next functional block 130 of the firmware code 124 and return to operation 210. In some examples, this may continue until the processor 112 has executed operations 210 and (if called for) 212 for each of the functional blocks 128, 130, 132, 134 of the firmware code 124. When the processor 112 determines that it has considered the last functional block 134 of the firmware code 124 at operation 214, the processor may proceed to its next operation set up at operation 216.

Although the process flow 200 is described with respect to patch code 138, 140 being available for a functional block, it will be appreciated that the disclosure herein may be executed in arrangements where a functional block 128, 130, 132, 134 may be partially patched. For example, patch code 138, 140 may correspond to a sub-block of a functional block 128, 130, 132, 134. In this way, functional blocks may be partially patched.

Figure 3:
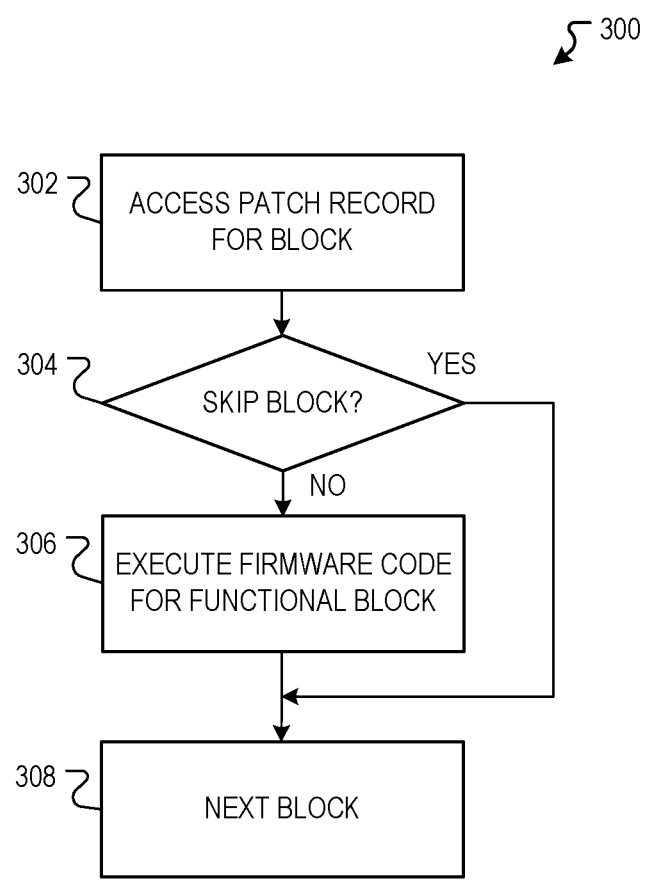
FIG. 3 is a flow chart showing one example of a process flow that may be executed by a processor of the SOC to process a functional block of the firmware code that has been patched.

FIG. 3 is a flow chart showing one example of a process flow 300 that may be executed by the processor 112 to process a functional block 128, 130, 132, 134 of the firmware code 124 that has been patched. For example, the process flow 300 shows one example way that the processor 112 may execute operation 212 of the process flow 200.

At operation 302, the processor 112 may access a patch record from the patch table data structure 136 corresponding to the functional block 128, 130, 132, 134 that is being patched. The processor 112 may access the patch record from the non-volatile memory 108 and/or may access the patch record from the RAM 110, for example, if the patch table data structure 136 was previously loaded to the RAM 110. The patch record accessed at operation 302 may include patch code 138, 140 corresponding to the considered functional block 128, 130, 132, 134. In some examples, the patch record may also include a variable or other data indicating the nature of the patch to the functional block 128, 130, 132, 134.

For example, the functional block 128, 130, 132, 134 may be skipped and or supplemented. A functional block 128, 130, 132, 134 may be skipped, for example, if the functional block includes a bug or other error. The patch code 138, 140 for the functional block 128, 130, 132, 134, may then include a version of the functional block 128, 130, 132, 134 that has been corrected to remove the bug or other error. Accordingly, the functional block 128, 130, 132, 134 may be skipped and the patch code 138, 140 executed instead.

A functional block 128, 130, 132, 134 may be supplemented, for example, to add functionality to that functional block. Consider an example in which the SOC 102 is configured to receive inputs from one or more sensors. It may be determined after the firmware code 124 is complete that the signal processing circuitry 120 should be configured to perform an additional signal conditioning function for one of the sensors. In this example, the functional block 128, 130, 132, 134 may be executed and the patch code 138, 140 for the functional block may also be executed. The patch code 138, 140 may initialize the initial signal conditioning function.

At operation 304, the processor 112 may determine whether the considered functional block 128, 130, 132, 134 is to be skipped. If the considered functional block is not to be skipped, then the processor 112, at operation 306, may execute the functional block 128, 130, 132, 134 as indicated in the firmware code 124. In addition to executing the functional block 128, 130, 132, 134, or after determining that the functional block should be skipped at operation 304, the processor may, at operation 308, move to consideration of the next functional block.

Figure 4:
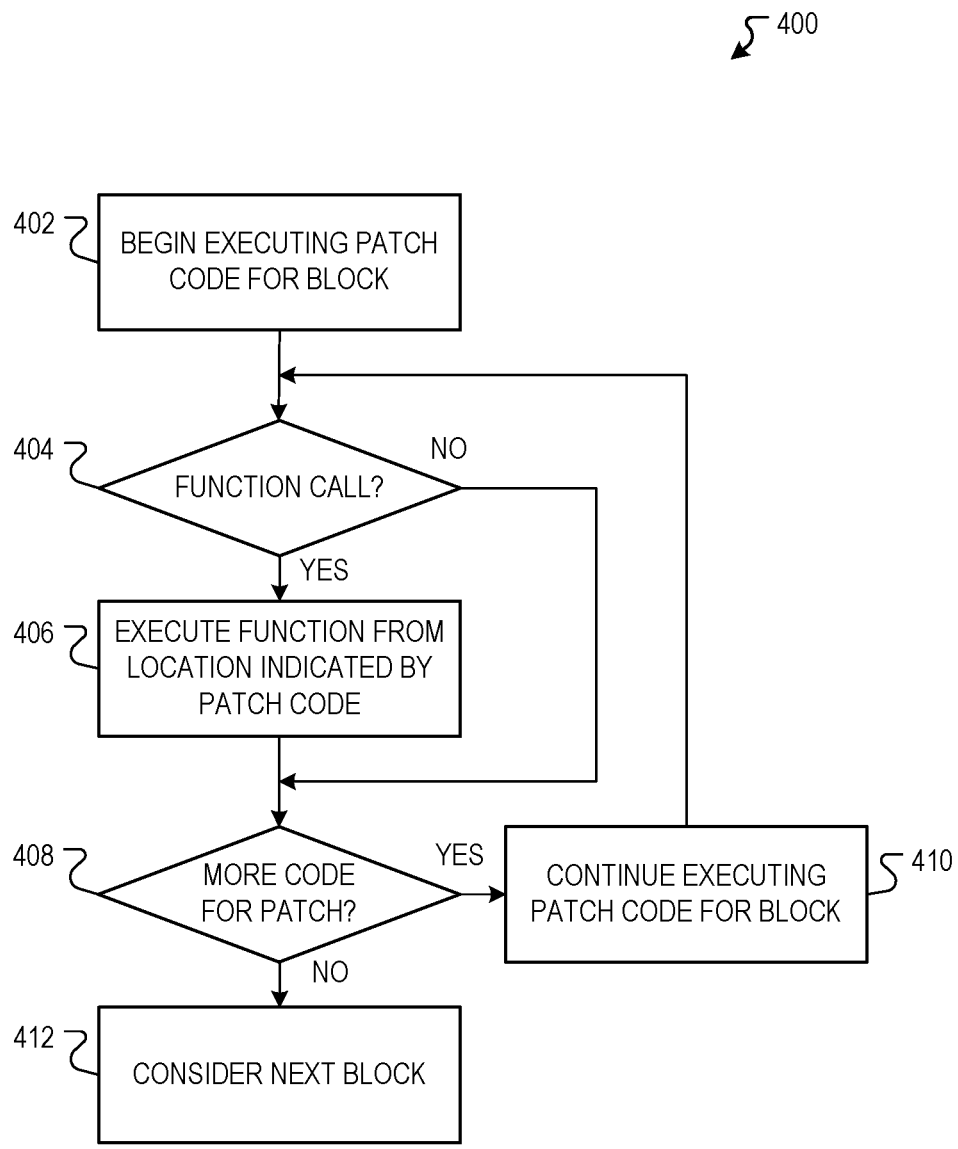
FIG. 4 is a flow chart showing one example of a process flow that may be executed by a processor of the SOC to implement patching for a functional block while reusing portions of the functional block.

In some examples, implementing a patch for a functional block 128, 130, 132, 134 may include reusing portions of the functional block, for example, on a function-by-function basis. The functional blocks 128, 130, 132, 134 may include calls to various functions. The patch code 138, 140 for a functional block, in some examples, may include code to replace one or more of the called functions while others of the called functions are executed from the functional block 128, 130, 132, 134. FIG. 4 is a flow chart showing one example of a process flow 400 that may be executed by the processor 112 to execute patch code 138, 140 for a functional block. The process flow 400 illustrates example function calls that can be from the patch code 138, 140, and/or from functional block 128, 130, 132, 134 stored at the boot ROM 106. At operation 402, the processor 112 may begin executing patch code 138, 140 for a functional block. For example, processor 112 may have retrieved the patch code 138, 140 from a patch record at the patch table data structure 136 corresponding to the functional block 128, 130, 132, 134 that is being patched, for example, as described herein. The processor 112 may access the patch record from the non-volatile memory 108 and/or may access the patch record from the RAM 110, for example, if the patch table data structure 136 was previously loaded to the RAM 110.

In executing the patch code 138, 140, the processor 112 may encounter a function call. At operation 404, the processor 112 determines whether a function call is encountered. If a function call is encountered, the processor 112 may execute the function from a location indicated by the patch code 13A, 140. For example, the function call in the patch code 138, 140 may include an address describing the location of code to be executed to implement the function. In some examples, the address may refer to a location in the patch code 138, 140 itself. In other examples, the address may refer to a location in the boot ROM 106 storing a portion of the firmware 124 corresponding to the functional block 128, 130, 132, 134.

After executing a function and/or after determining that no function call has been made, the processor 112 may determine, at operation 408, whether there is additional code to be executed at the patch code 13A, 140. If there is no additional code from the patch code 138, 140, then the processor 112 may consider a next functional block of the firmware 124 at operation 412. (If all functional blocks have been executed, then the processor 112 may conclude its execution of the firmware 124.)

If, at operation 408, the processor 112 determines that there is additional patch code 13A, 140 to be executed, it may continue executing the patch code 138, 140 at operation 410. Continuing to execute the patch code 13A, 140 may include returning to operation 404 to determine if the remaining patch code 13A, 140 includes a function call.

Figure 5:
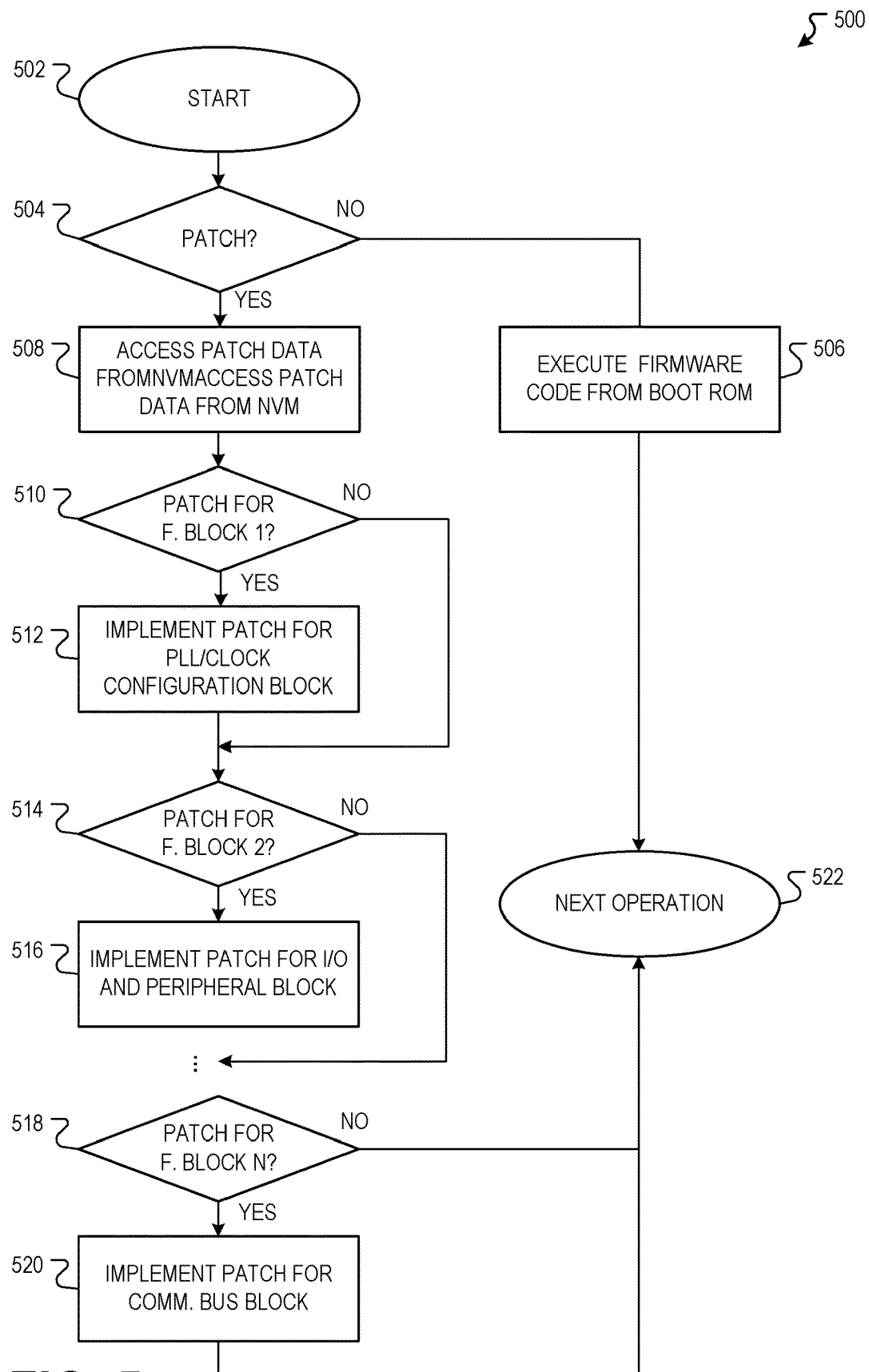
FIG. 5 is a flow chart showing one example of a process flow that may be executed by a processor of the SOC to execute the firmware code.

FIG. 5 is a flow chart showing one example of a process flow 500 that may be executed by a processor of the SOC 102, such as the processor 112, to execute the firmware code 124. At operation 502, the processor 112 may begin to execute the firmware code 124. In some examples, the processor 112 may load the firmware code 124 from the boot ROM 106 to the RAM 110. At operation 504, the processor 112 may determine whether firmware patching is active for the SOC 102, for example, as described herein. If firmware patching for the SOC 102 is not active, the processor 112 may, at operation 506, execute the firmware code 124 as accessed from the boot ROM 106 and proceed to its next program operation at operation 522.

If firmware patching is active for the SOC 102, the processor 112 may, at operation 508, access patch data from the non-volatile memory 108. At operation 510, the processor 112 may determine if a first functional block 128 of the firmware code 124 has been patched. In this example, the first functional block 128 is configured to initiate a PLL and configure a clock for the SOC 102. If the first functional block 128 has been patched, the processor 112 may implement a patch for the first functional block 128 at operation 512. Implementing the patch may include executing patch code for the block as described herein. Implementing the patch may also cause the processor 112 to complete the function of the first functional block 128. In this example, that may include initiating the PLL and configuring the clock for the SOC 102.

If the first functional block 128 is not patched at operation 510, and/or after implementing the patch for the first functional block 128 at operation 512, the processor 112 may determine, at operation 514, whether the second functional block 130 of the firmware code 124 is patched. In this example, the second functional block 130 initiates one or more I/O interfaces and/or peripherals. If the second functional block 130 has been patched, then the processor 112 may implement the patch for the second functional block 130, at operation 516, to initiate the one or more I/O and/or peripherals.

The process may continue functional block-by-functional block. At operation 518, the processor 112 may determine if the last functional block of the firmware code 124 has been patched. In this example the last functional block 134 may initiate the bus 122. If the last functional block 134 has been patched, the processor 112 may implement the patch for the last functional block, at operation 520, to initiate the communications communication bus 122. After implementing the patch for the last functional block 134 or if the last functional block is not patched, the processor may proceed to its next operation at operation 522. It will be appreciated that, in some examples, processor 112 may evaluate some or all of the functional blocks to determine whether those functional blocks should be skipped, for example, as described with respect to FIG. 3.

Figure 6:
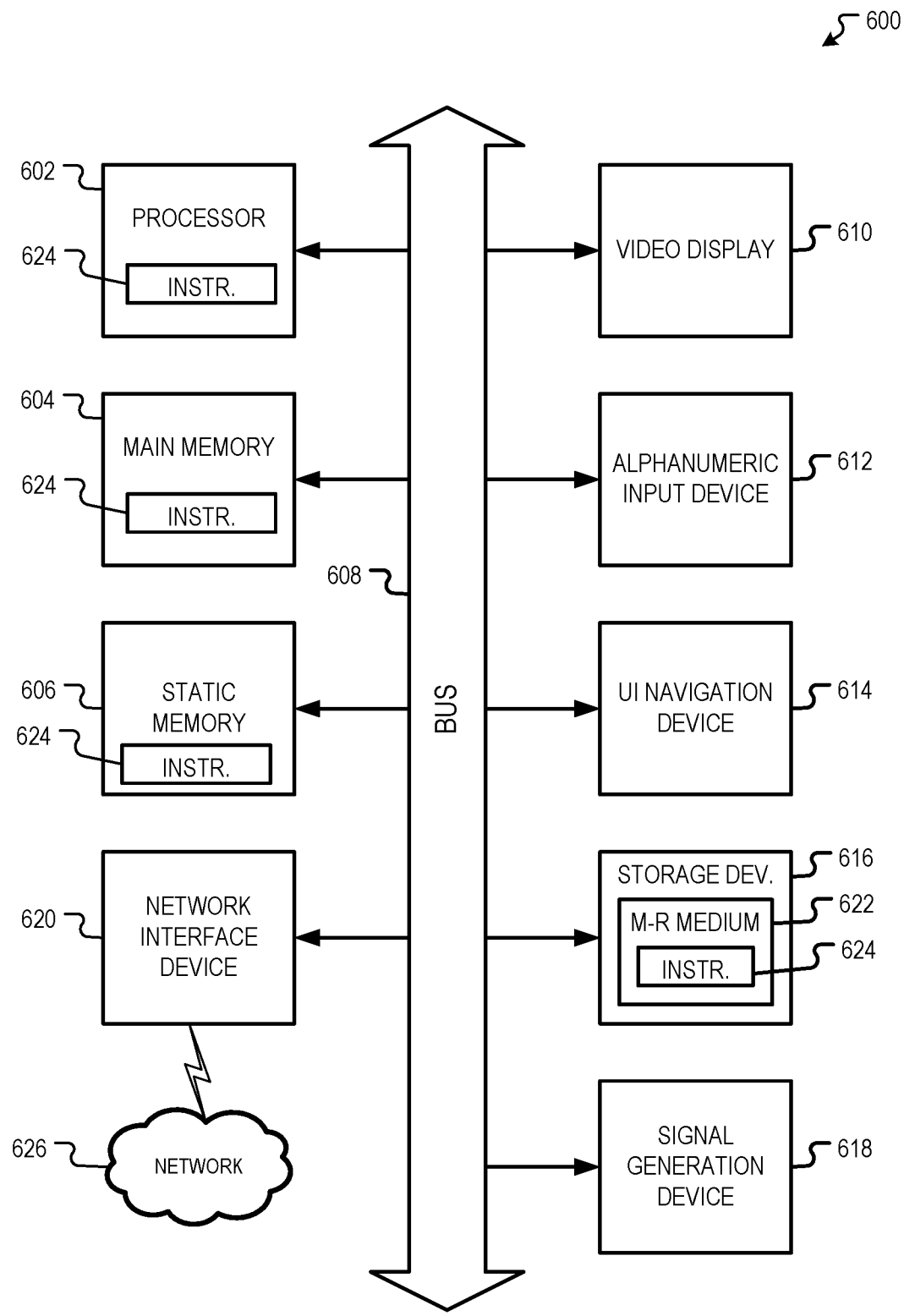
FIG. 6 is a block diagram illustrating a computing device hardware architecture, within which a set or sequence of instructions can be executed to cause a machine to perform examples of any one of the methodologies discussed herein.

FIG. 6 is a block diagram illustrating a computing device hardware architecture 600, within which a set or sequence of instructions can be executed to cause a machine to perform examples of any one of the methodologies discussed herein. For example, the architecture 600 may describe one example arrangement of an SOC that may implement the systems and methods described herein. The architecture 600 may operate as a standalone device or may be connected (e.g., networked) to other machines. In a networked deployment, the architecture 600 may operate in the capacity of either a server or a client machine in server-client network environments, or it may act as a peer machine in peer-to-peer (or distributed) network environments. The architecture 600 can be implemented in an embedded system, a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 600 includes a processor unit 602 comprising at least one processor (e.g., a central processing unit (CPU), a graphics processing unit (GPU), or both, processor cores, compute nodes). The architecture 600 may further comprise a main memory 604 and a static memory 606, which communicate with each other via a link 608 (e.g., a bus). The architecture 600 can further include a video display unit 610, an input device 612 (e.g., a keyboard), and a user interface (UI) navigation device 614 (e.g., a mouse). In some examples, the video display unit 610, input device 612, and UI navigation device 614 are incorporated into a touchscreen display. The architecture 600 may additionally include a storage device 616 (e.g., a drive unit), a signal generation device 618 (e.g., a speaker), a network interface device 620, and one or more sensors (not shown), such as a Global Positioning System (GPS) sensor, compass, accelerometer, or other sensor.

In some examples, the processor unit 602 or another suitable hardware component may support a hardware interrupt. In response to a hardware interrupt, the processor unit 602 may pause its processing and execute an ISR, for example, as described herein.

The storage device 616 includes a machine-readable medium 622 on which is stored one or more sets of data structures and instructions 624 (e.g., software) embodying or used by any one or more of the methodologies or functions described herein. The instructions 624 can also reside, completely or at least partially, within the main memory 604, within the static memory 606, and/or within the processor unit 602 during execution thereof by the architecture 600, with the main memory 604, the static memory 606, and the processor unit 602 also constituting machine-readable media.

Executable Instructions and Machine-Storage Medium

The various memories (i.e., 604, 606, and/or memory of the processor unit(s) 602) and/or the storage device 616 may store one or more sets of instructions and data structures (e.g., the instructions 624) embodying or used by any one or more of the methodologies or functions described herein. These instructions, when executed by the processor unit(s) 602, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 can further be transmitted or received over a communications network 626 using a transmission medium via the network interface device 620 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

VARIOUS NOTES & EXAMPLES

Example 1 is a System on a Chip (SOC) comprising: at least one processor; and at least one memory comprising instructions stored thereon that, when executed by the at least one processor, because the at least one processor to perform operations comprising: accessing firmware code from a boot Read-Only Memory (ROM) of the at least one memory, the firmware code comprising a plurality of functional blocks; determining that firmware patching is active for the SOC; accessing patch data from a non-volatile memory of the at least one memory; determining that a first functional block of the firmware code has been patched; accessing first patch code from the patch data, the first patch code being associated with the first functional block; and executing the first patch code.

In Example 2, the subject matter of Example 1 optionally includes the operations further comprising: determining that a second functional block of the firmware code has not been patched; and executing the second functional block of the firmware code.

In Example 3, the subject matter of any one or more of Examples 1-2 optionally include the operations further comprising loading the patch data from the ROM of the SOC to a random-access memory of the SOC.

In Example 4, the subject matter of any one or more of Examples 1-3 optionally include the patch data comprising a patch table data structure, the patch table data structure comprising a plurality of functional block records, wherein the first patch code is stored at a first functional block record of the patch table data structure.

In Example 5, the subject matter of any one or more of Examples 1-4 optionally include the operations further comprising determining to skip execution of the first functional block of the firmware code.

In Example 6, the subject matter of any one or more of Examples 1-5 optionally include the operations further comprising: determining to execute the first functional block of the firmware code; and executing the first functional block of the firmware code.

In Example 7, the subject matter of Example 6 optionally includes the patch data comprising a patch table data structure, the patch table data structure comprising a plurality of functional block records, the determining to execute the first functional block of the firmware code comprising accessing a first functional block record from the patch data table data structure, the first functional block record being associated with the first functional block of the firmware code.

In Example 8, the subject matter of any one or more of Examples 1-7 optionally include the operations further comprising: determining to reuse a portion of the first functional block of the firmware code; accessing a firmware memory symbol map; and modifying the first patch code to comprise a call to a function from the first functional block of the firmware, the call being based at least in part on the firmware memory symbol map, and the executing of the first patch code comprising executing the modified first patch code.

In Example 9, the subject matter of any one or more of Examples 1-8 optionally include the operations further comprising: accessing the firmware code from the boot ROM of the SOC; determining that firmware patching is not active; and responsive to determining that firmware patching is not active, executing the firmware code.

In Example 10, the subject matter of any one or more of Examples 1-9 optionally include the determining that firmware patching is active for the SOC comprising determining that a bootstrap pin of the SOC is asserted.

In Example 11, the subject matter of any one or more of Examples 1-10 optionally include the determining that firmware patching is active for the SOC comprising reading first data from a first location of a non-volatile memory at the SOC, the determining being based at least in part on the first data.

Example 12 is a method of executing firmware at a System on a Chip (SOC), the method comprising: accessing firmware code from a boot Read-Only Memory (ROM) of the SOC, the firmware code comprising a plurality of functional blocks; determining that firmware patching is active for the SOC; accessing patch data from a non-volatile memory of the SOC; determining that a first functional block of the firmware code has been patched; accessing first patch code from the patch data, the first patch code being associated with the first functional block; and executing the first patch code.

In Example 13, the subject matter of Example 12 optionally includes the executing of the firmware further comprising: determining that a second functional block of the firmware code has not been patched; and executing the second functional block of the firmware code.

In Example 14, the subject matter of any one or more of Examples 12-13 optionally include loading the patch data from the ROM of the SOC to a random-access memory of the SOC.

In Example 15, the subject matter of any one or more of Examples 12-14 optionally include the patch data comprising a patch table data structure, the patch table data structure comprising a plurality of functional block records, wherein the first patch code is stored at a first functional block record of the patch table data structure.

In Example 16, the subject matter of any one or more of Examples 12-15 optionally include determining to skip execution of the first functional block of the firmware code.

In Example 17, the subject matter of any one or more of Examples 12-16 optionally include determining to execute the first functional block of the firmware code; and executing the first functional block of the firmware code.

In Example 18, the subject matter of Example 17 optionally includes the patch data comprising a patch table data structure, the patch table data structure comprising a plurality of functional block records, the determining to execute the first functional block of the firmware code comprising accessing a first functional block record from the patch data table, the first functional block record being associated with the first functional block of the firmware code.

In Example 19, the subject matter of any one or more of Examples 12-18 optionally include determining to reuse a portion of the first functional block of the firmware code; accessing a firmware memory symbol map; and modifying the first patch code to comprise a call to a function from the first functional block of the firmware, the call being based at least in part on the firmware memory symbol map, and the executing of the first patch code comprising executing the modified first patch code.

Example 20 is a machine-readable medium comprising instructions thereon that, when executed by at least one processor, cause the at least one processor to perform operations comprising: accessing firmware code from a boot Read-Only Memory (ROM) of a System on a Chip (SOC), the firmware code comprising a plurality of functional blocks; determining that firmware patching is active for the SOC; accessing patch data from a non-volatile memory of the SOC; determining that a first functional block of the firmware code has been patched; accessing first patch code from the patch data, the first patch code being associated with the first functional block; and executing the first patch code.

The above detailed description includes references to the accompanying drawings, which form a part of the detailed description. The drawings show, by way of illustration, specific embodiments in which the disclosed examples can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The term "circuit" can include a dedicated hardware circuit, a general-purpose microprocessor, digital signal processor, or other processor circuit, and may be structurally configured from a general purpose circuit to a specialized circuit such as using firmware or software.

Any one or more of the techniques (e.g., methodologies) discussed herein may be performed on a machine. In various embodiments, the machine may operate as a standalone device or may be connected (e.g., networked) to other machines. In a networked deployment, the machine may operate in the capacity of a server machine, a client machine, or both in server-client network environments. In an example, the machine may act as a peer machine in peer-to-peer (P2P) (or other distributed) network environment. The machine may be a PC, a tablet PC, a STB, a PDA, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions can enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Particular implementations of the systems and methods described herein may involve use of a machine (e.g., computer system) that may include a hardware processor (e.g., a CPU, a GPU, a hardware processor core, or any combination thereof), a main memory and a static memory, some or all of which may communicate with each other via an interlink (e.g., bus). The machine may further include a display unit, an alphanumeric input device (e.g., a keyboard), and a UI navigation device (e.g., a mouse). In an example, the display unit, input device and UI navigation device may be a touch screen display. The machine may additionally include a storage device (e.g., drive unit), a signal generation device (e.g., a speaker), a network interface device, and one or more sensors, such as a GPS sensor, compass, accelerometer, or other sensor. The machine may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device may include a machine readable medium on which is stored one or more sets of data structures or instructions (e.g., software) embodying or utilized by any one or more of the techniques or functions described herein. The instructions may also reside, completely or at least partially, within the main memory, within static memory, or within the hardware processor during execution thereof by the machine. In an example, one or any combination of the hardware processor, the main memory, the static memory, or the storage device may constitute machine readable media.

While the machine readable medium can include a single medium, the term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., EPROM, EEPROM) and flash memory devices; magnetic disks, such as internal hard disks and removable disks; magneto-optical disks; and CD-ROM and DVD-ROM disks.

The instructions may further be transmitted or received over a communications network using a transmission medium via the network interface device utilizing any one of a number of transfer protocols (e.g., frame relay, internet protocol (IP), transmission control protocol (TCP), user datagram protocol (UDP), (HTTP, etc.). Example communication networks may include a LAN, a WAN, a packet data network (e.g., the Internet), mobile telephone networks (e.g., cellular networks), POTS networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine, and includes digital or analog communications signals or other intangible medium to facilitate communication of such software.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, RAMs, ROMs, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

The invention claimed is:

1. A System on a Chip (SOC) comprising:
 at least one processor; and
 the at least one processor programmed to perform operations comprising:
  accessing firmware code from a boot Read-Only Memory (ROM), the firmware code comprising a plurality of functional blocks;
  determining that firmware patching is active for the SOC;
  accessing patch data from a non-volatile memory of the SOC;
  determining that a first functional block of the firmware code has been patched;

accessing first patch code from the patch data, the first patch code being associated with the first functional block;

determining to reuse a portion of the first functional block of the firmware code;

accessing a firmware memory symbol map;

modifying the first patch code to comprise a call to a function from the first functional block of the firmware code, the call being based at least in part on the firmware memory symbol map; and executing the first patch code, the executing of the first patch code comprising executing the modified first patch code.

2. The SOC of claim 1, the operations further comprising:
determining that a second functional block of the firmware code has not been patched; and
executing the second functional block of the firmware code.

3. The SOC of claim 1, the operations further comprising loading the patch data from the ROM of the SOC to a random-access memory of the SOC.

4. The SOC of claim 1, the patch data comprising a patch table data structure, the patch table data structure comprising a plurality of functional block records, wherein the first patch code is stored at a first functional block record of the patch table data structure.

5. The SOC of claim 1, the operations further comprising determining to skip execution of the first functional block of the firmware code.

6. The SOC of claim 1, the operations further comprising:
determining to execute the first functional block of the firmware code; and
executing the first functional block of the firmware code.

7. The SOC of claim 6, the patch data comprising a patch table data structure, the patch table data structure comprising a plurality of functional block records, the determining to execute the first functional block of the firmware code comprising accessing a first functional block record from the patch data table data structure, the first functional block record being associated with the first functional block of the firmware code.

8. The SOC of claim 1, the operations further comprising:
accessing the firmware code from the boot ROM of the SOC;
determining that firmware patching is not active; and
responsive to determining that firmware patching is not active, executing the firmware code.

9. The SOC of claim 1, the determining that firmware patching is active for the SOC comprising determining that a bootstrap pin of the SOC is asserted.

10. The SOC of claim 1, the determining that firmware patching is active for the SOC comprising reading first data from a first location of a non-volatile memory at the SOC, the determining being based at least in part on the first data.

11. A method of executing firmware at a System on a Chip (SOC), the method comprising:
accessing firmware code from a boot Read-Only Memory (ROM) of the SOC, the firmware code comprising a plurality of functional blocks;
determining that firmware patching is active for the SOC;
accessing patch data from a non-volatile memory of the SOC;
determining that a first functional block of the firmware code has been patched;
accessing first patch code from the patch data, the first patch code being associated with the first functional block;
determining to reuse a portion of the first functional block of the firmware code;
accessing a firmware memory symbol map;
modifying the first patch code to comprise a call to a function from the first functional block of the firmware code, the call being based at least in part on the firmware memory symbol map; and
executing the first patch code, the executing of the first patch code comprising executing the modified first patch code.

12. The method of claim 11, the executing of the firmware further comprising:
determining that a second functional block of the firmware code has not been patched; and
executing the second functional block of the firmware code.

13. The method of claim 11, further comprising loading the patch data from the ROM of the SOC to a random-access memory of the SOC.

14. The method of claim 11, the patch data comprising a patch table data structure, the patch table data structure comprising a plurality of functional block records, wherein the first patch code is stored at a first functional block record of the patch table data structure.

15. The method of claim 11, further comprising determining to skip execution of the first functional block of the firmware code.

16. The method of claim 11, further comprising:
determining to execute the first functional block of the firmware code; and
executing the first functional block of the firmware code.

17. The method of claim 16, the patch data comprising a patch table data structure, the patch table data structure comprising a plurality of functional block records, the determining to execute the first functional block of the firmware code comprising accessing a first functional block record from the patch data table, the first functional block record being associated with the first functional block of the firmware code.

18. A non-transitory machine-readable medium comprising instructions thereon that, when executed by at least one processor, cause the at least one processor to perform operations comprising:
accessing firmware code from a boot Read-Only Memory (ROM) of a System on a Chip (SOC), the firmware code comprising a plurality of functional blocks;
determining that firmware patching is active for the SOC;
accessing patch data from a non-volatile memory of the SOC;
determining that a first functional block of the firmware code has been patched;
accessing first patch code from the patch data, the first patch code being associated with the first functional block;
determining to reuse a portion of the first functional block of the firmware code;
accessing a firmware memory symbol map;
modifying the first patch code to comprise a call to a function from the first functional block of the firmware code, the call being based at least in part on the firmware memory symbol map; and
executing the first patch code, the executing of the first patch code comprising executing the modified first patch code.

19. The medium of claim 18, the operations further comprising:

determining that a second functional block of the firmware code has not been patched; and executing the second functional block of the firmware code.

20. The medium of claim 18, the operations further comprising loading the patch data from the ROM of the SOC to a random-access memory of the SOC.

\* \* \* \* \*